(No Model.)

E. B. WAY.
CHURN.

No. 286,510. Patented Oct. 9, 1883.

Witnesses.
H. J. Osgood
P. Pritz

Inventor
Eli B. Way
by Howard A. Snow
Atty

UNITED STATES PATENT OFFICE.

ELI B. WAY, OF KNOBNOSTER, MISSOURI.

CHURN.

SPECIFICATION forming part of Letters Patent No. 286,510, dated October 9, 1883.

Application filed February 9, 1883. (No model.)

*To all whom it may concern:*

Be it known that I, ELI B. WAY, a citizen of the United States, residing at Knobnoster, in the county of Johnson and State of Missouri, have invented certain new and useful Improvements in Churns, of which the following is a specification, reference being had therein to the accompanying drawings.

My invention relates to churns; and it consists in the construction and arrangement of its several parts, as will be hereinafter fully set forth, and pointed out in the claims.

Figure 1:
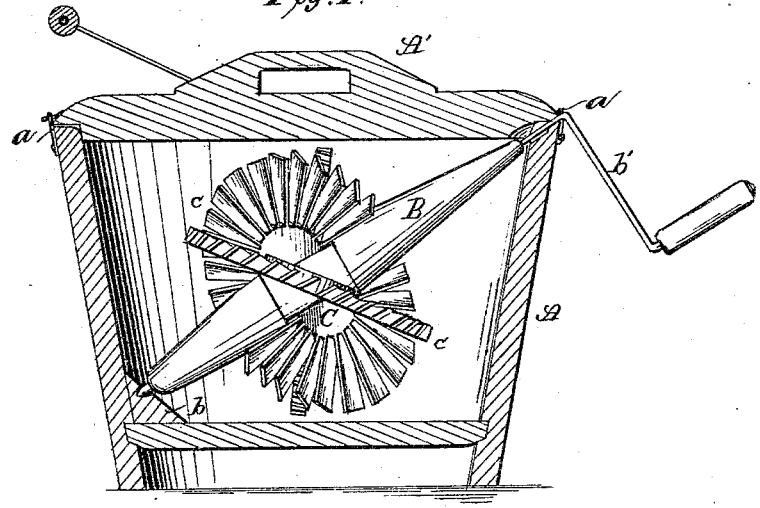
Figure 2:
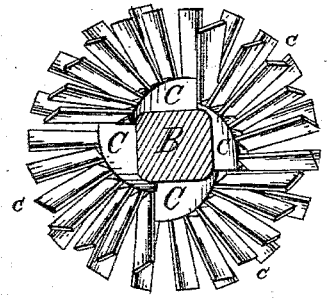
Figure 3:
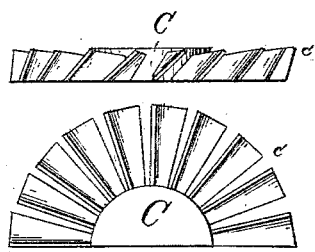

In the drawings, Figure 1 is a vertical longitudinal section of my invention; Fig. 2, a cross-section of the shaft, showing the arrangement of the paddles thereon; and Fig. 3 is a detail of one of the series of paddles.

A represents a bucket of ordinary construction, having a top, A', secured to the sides thereof by means of the hooks $a$, as shown. Journaled in a block, $b$, secured against the bottom and side of the bucket, and through a suitable opening in its rim, is the dasher-shaft B. It may be stated here, however, that in practice I prefer the construction shown in Fig. 1, wherein the shaft ends are inside the bucket, and the crank-shaft $b'$ forms the journal-shaft through the rim of the bucket. In the construction of the dasher-shaft B the central portion is thick and square and tapers toward each end, as shown. Secured centrally around the shaft B, preferably one to each of its sides, are semicircular plates C, from the edges of which, and on a line parallel with central radiations from the shaft, are the blades $c$. These blades are set at an angle to the direction of the plates, as shown, and the plates are set at an angle to the direction of the dasher-shaft, so that in the revolution thereof the cream passes through each series of blades in a different direction from that at which it passed through the previous series, thus securing a zigzag course for the cream in passing through the dasher, and consequently a thorough agitation of the cream. It will also be seen that each dasher crosses the path taken by the direction of the cream issuing from the previous one, thus securing certain results.

The advantages obtained by this dasher are that it is applicable to buckets of ordinary construction by the simple addition of the block $b$ and the cover A'.

The action upon the cream is such as to cause the greatest amount of agitation by means of the peculiar arrangement of the blades shown.

What I claim is—

1. The combination, with the bucket A, of the dasher-shaft journaled therein and provided with plates C, having secured thereto the blades $c$, all arranged to operate substantially as shown and described.

2. In combination, the bucket A, the shaft B, having its central portion made square, as shown, and a semicircular plate, C, attached to each side, set at an angle to the direction of the shaft, and having blades $c$, projected from the edges and set at an angle to the direction thereof, substantially as shown and described.

In testimony whereof I affix my signature in presence of two witnesses.

ELI B. WAY.

Witnesses:
W. W. WOODMANCY,
W. W. VAUGHAN.